United States Patent

[11] 3,612,504

[72] Inventor Julian C. Garate
Reno, Nev.
[21] Appl. No. 875,388
[22] Filed Nov. 10, 1969
[45] Patented Oct. 12, 1971
[73] Assignees Charles V. Prather;
Birgit K. Preston; C. A. Luckey, Reno, Nev.
, part interest to each

[54] ROLL AND SWAY CONTROL SYSTEM
14 Claims, 10 Drawing Figs.
[52] U.S. Cl. .................................................. 267/20,
280/124
[51] Int. Cl. ...................................................... B60g 11/16
[50] Field of Search ............................................ 267/20, 60;
280/124, 112

[56] References Cited
UNITED STATES PATENTS
3,049,359  8/1962  Geyer ........................  267/20 X
2,639,165  5/1953  Winters ......................  267/20 X Primary Examiner—Philip Goodman
Attorneys—Clarence A. O'Brien and Harvey B. Jacobson ABSTRACT: A spring-controlled structure operatively connected between a corresponding vertically shiftable wheel of a vehicle and frame and body of an associated vehicle and functioning to increasingly yieldingly resist upward motion of body and frame of the associated vehicle from a predetermined position when the vehicle is in a stationary position. The structure increasingly yieldingly resists the distance of separation between the vertically shiftable wheel and a predetermined position of vertical travel of the vertically shiftable body in an up movement past the predetermined stationary rebound point. However, the structure does effectively slow the downward motion of the vertically shiftable wheel and increasingly speeds up the rebound to the original static or predetermined position between the vertically shiftable frame and vertically shiftable wheel. The structure does not aid in laden weight carrying capacity of the associated vehicle, but does effectively control laden weight and high center of gravity laden weight by increasingly yieldingly resisting the frame and body of associated vehicle in any upward and side-to-side motion of high loads. Also, the structure does effectively control the upward movement of an associated vehicle without weight other than that of the associated vehicle.

PATENTED OCT 12 1971 3,612,504

Julian C. Garate
INVENTOR.

BY Clarence A. O'Brien
and Harvey B. Jacobson
Attorneys

Julian C. Garate
INVENTOR.

Julian C. Garate
INVENTOR.

ROLL AND SWAY CONTROL SYSTEM

The roll and sway control system of the instant invention functions to reduce any tendency of the associated vehicle to sway, roll or yaw. Further, steering the associated vehicle is more precise and ride control is greatly increased over substantially all types of surfaces which the associated vehicle may be driven.

Basically, the control system of the instant invention functions only to yieldingly resist upward movement of the associated body past a predetermined position. However, this simple function can have substantial effects on and improve various handling characteristics of the associated vehicle. Increased traction is afforded providing for greater cornering ability and increased braking control increased acceleration traction and increased tire mileage are also afforded as a result of more even contact of the tires with the road. In addition, body roll is reduced and the life of shock absorbers is increased due to less vertical and side-to-side travel of the associated vehicle body.

In addition to the above specifically mentioned improved handling characteristics of a vehicle equipped with the control system of the instant invention, many other benefits are either directly or indirectly gained through the utilization of the system.

The main object of this invention is to provide a control system for the vertically shiftable wheels and vertically shiftable body of a vehicle and operated to yieldingly resist upward movement of the vertically shiftable body above a predetermined position thereof spaced above the normal laden position thereof and below the lower limit positions of the vertically shiftable wheels thereof.

Another object of this invention, in accordance with the immediately preceding object, is to provide a control system which may be readily added to substantially all types of vehicle suspension systems.

Another important object of this invention is to provide a control system whose components may be readily slightly modified in order to adapt the control system for utilization in connection with substantially any wheeled vehicle.

A still further object of this invention is to provide a control system in accordance with the preceding objects and which may be mounted upon an associated vehicle with substantially little increase in weight to the unsprung components of the suspension system of the vehicle.

A final object of this invention to be specifically enumerated herein is to provide a control system which will conform to conventional forms of manufacture, be of simple construction and easy to install so as to provide a device that will be economically feasible, long lasting and relatively trouble-free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
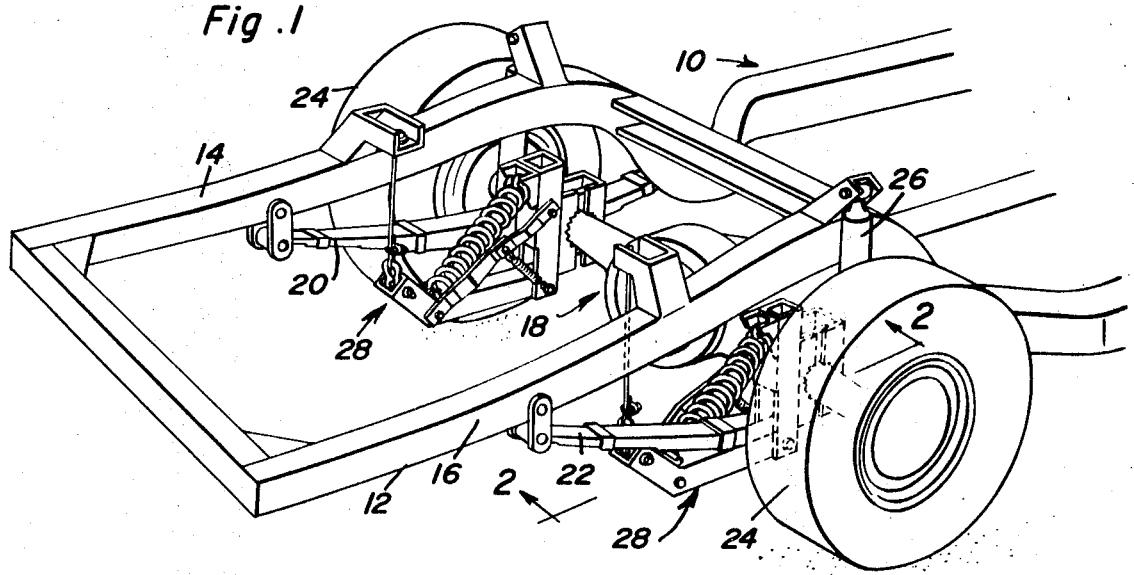
FIG. 1 is a fragmentary perspective view of the rear end portion of a conventional form of motor vehicle with which the roll and sway control system of the instant invention is operatively associated.

Referring now more specifically to the drawings, the numeral 10 generally designates a conventional vehicle chassis including a frame 12 having opposite longitudinal side members 14 and 16 from which a rear axle assembly referred to in general by the reference numeral 18 is supported by means of a pair of conventional leaf springs 20 and 22. A pair of ground-engaging wheels 24 are journaled from the opposite ends of the axle assembly 18 and a pair of shock absorbers 26 are connected between the frame 12 and corresponding ends of the axle assembly 18.

The above comprises a description of a conventional form of vehicle suspension assembly with which the roll and sway control system of the instant invention may be used. The roll and sway control system includes a pair of roll and sway control assemblies generally referred to by the reference numerals 28 and it may be seen from FIGS. 1-4 of the drawings that each roll and sway control assembly 28 includes a first upstanding arm 30 and a second horizontally disposed and longitudinally extending arm 32 whose forward end is pivotally supported from the lower end of the arm 30.

The arm 30 comprises an upstanding tubular member which is generally rectangular in cross section and to whose forward face a forwardly opening upstanding channel member 34 is secured by means of suitable fasteners 36. The forwardly projecting flanges 38 of the channel member 34 are provided with forwardly opening toothed notches 40 and each roll and sway control assembly 28 includes a second channel member 42 which is substantially identical to the channel member 34 and opens toward and opposes the channel member 34 in slightly spaced relation. The channel members 32 and 34 are disposed at the rear and front sides of the corresponding end of the housing 44 of the axle assembly 18 and a pair of threaded bolts 46 and 48 are secured through the bight portions of the channel members 34 and 42 in order to clamp the housing 44 therebetween and thus mount the arm 30 in stationary position relative to the housing 44.

The rear wall 50 of the tubular arm 30 is cut away adjacent the lower end of the arm 30 and the forward end of the horizontal longitudinally extending arm 32 is pivoted between the lower portions of the sidewalls 52 of the arm 30 by means of a pivot fastener 54. The arm 32 projects rearwardly from the lower end of the arm 30 and includes a rearwardly and upwardly inclined rear end portion 56 to which a spring seat member 58 is secured by means of suitable through bolts. In addition, a second spring seat member 62 is supported from the upper end of the rear wall 50 of the arm 30 by means of the bolt 48 and a rivet 64. In addition, the shank portion 66 of an eyebolt 68 is secured through the upper end of the arm 30.

Figure 2:
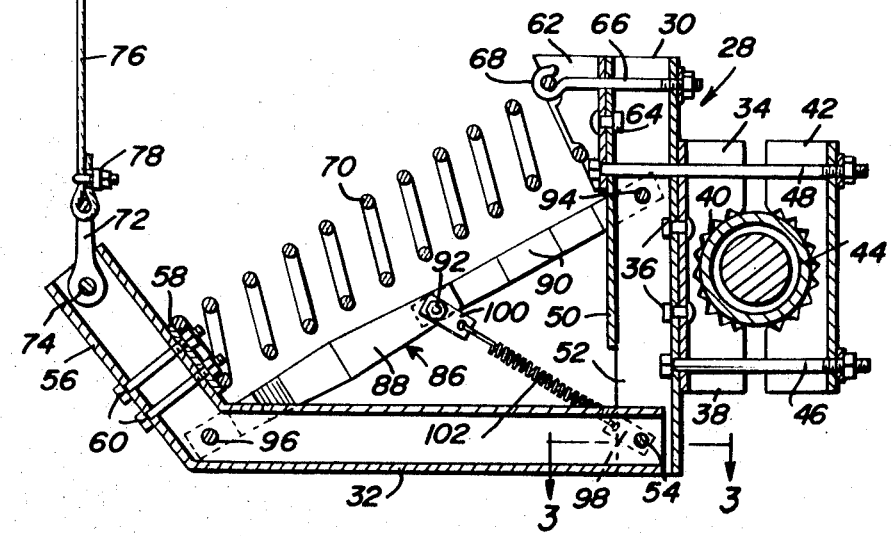
FIG. 2 is an enlarged fragmentary longitudinal vertical sectional view taken substantially upon the plane indicated by section line 2—2 of FIG. 1.

A compression spring 70 has its opposite ends seatingly engaged with the spring seat members 58 and 62 and serves to yieldingly urge the rear end portion 56 away from the spring seat member 62 and to therefore swing the arm 32 in a counterclockwise direction relative to the arm 30 as viewed in FIG. 2 of the drawings. In addition, a bail 72 is oscillatably supported within the free end of the rear end portion 56 of the arm 32 by means of a pivot fastener 74 and the lower end of an elongated flexible cable 76 is looped through the bail 72 and secured by means of a clamp 78. In addition, the upper end of the cable 76 is looped through an eyebolt 80 secured through a frame mount 82. The upper end of the cable 76 is secured through the eyebolt 80 by means of a clamp 84 which is similar to the clamp 78 and accordingly, it may be appreciated that upward movement of the frame 12 relative to the axle housing 44 will cause clockwise swinging of the arm 32 and compression of the coil spring 70.

Counterclockwise swinging movement of the arm 32 relative to the arm 30 is limited by means of an articulated link structure referred to in general by the reference numeral 86. The link structure 86 includes a pair of opposite end link sections 88 and 90 and the adjacent ends of the link sections 88 and 90 are overlapped and pivotally secured together by means of a pivot fastener 92 while the end of the link section 90 remote from the link section 88 is pivotally secured to the upper end portion of the arm 30 by means of a pivot fastener 94. The lower end of the link section 88 is pivotally secured to the rear end portion of the arm 32 by means of a pivot fastener 96 and a pair of anchor clips 98 and 100 are carried by the pivot fasteners 54 and 92 and have the opposite ends of an expansion spring 102 anchored thereto.

Figures 3, 4:
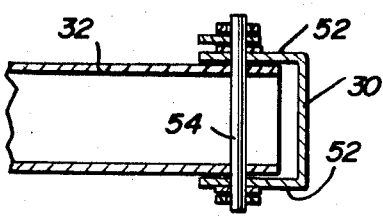
FIG. 3 is an enlarged fragmentary horizontal sectional view taken substantially upon the plane indicated by section line 3—3 of FIG. 2.
FIG. 4 is a perspective view of the coil spring seat attached to the swingable arm of the control system.

With attention now invited more specifically to FIG. 4 of the drawings, it may be seen that the spring seat member 58 comprises a generally U-shaped including side flanges 104 notched as at 106 and interconnected by means of a bight portion 108 through which the bolts 60, see FIG. 2, are secured.

While the link structure 86 limits counterclockwise swinging of the arm 32 to the position thereof illustrated in FIG. 2 of the drawings, the expansion spring 102 acts upon the pivot axis of the articulated joint of the link structure 86 so as to urge the fastener 92 toward the fastener 54. In this manner when an upward force is applied to the rear end of the arm 32, the link structure 86 will "break" in the manner illustrated in FIG. 6 of the drawings.

Figure 5:
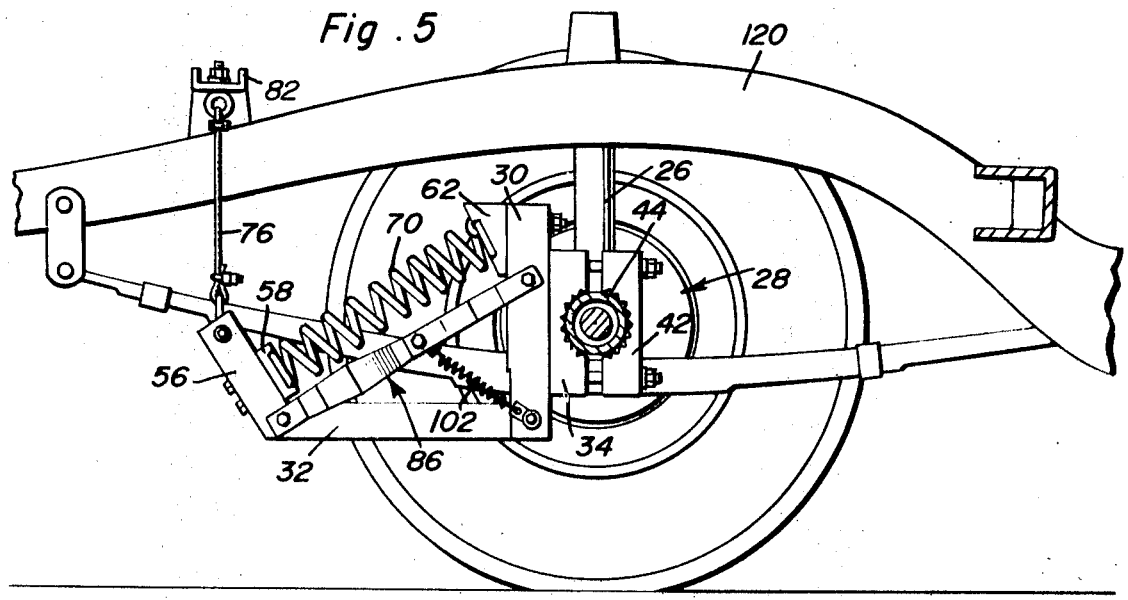
FIGS. 5 and 6 are fragmentary longitudinal vertical sectional views taken substantially upon a plane passing through the centerline of the vehicle illustrated in FIG. 1 and with the rear running gear components and the roll and sway control system components in different relative positions.
Figure 6:
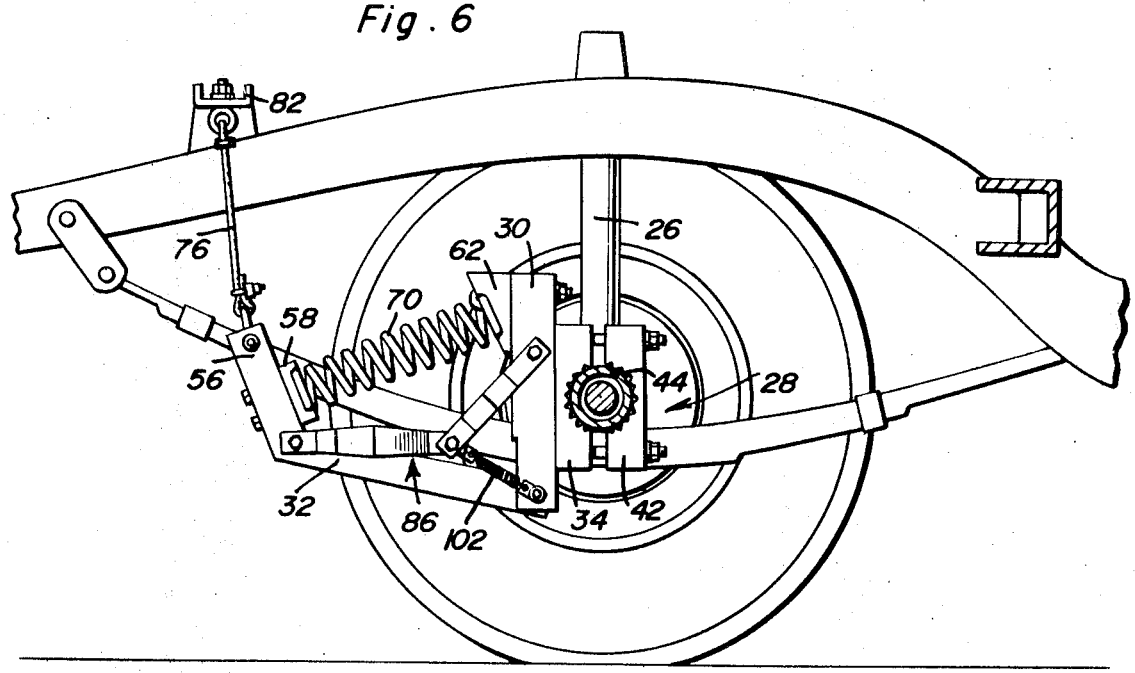
Figure 7:
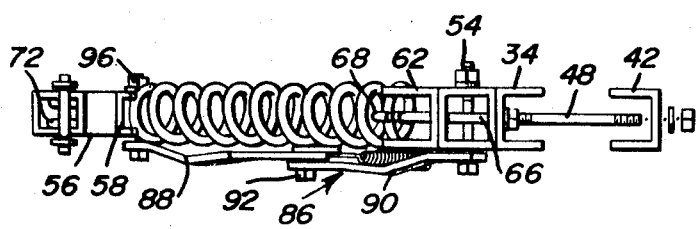
FIG. 7 is a top plan view of one of the roll and sway control assemblies.

With attention now invited more specifically to FIGS. 5 and 6 of the drawings, it will be noted that raising the frame 12 relative to the axle housing 44 causes the arm 32 to be swung in a clockwise direction and the compression spring 70 to be compressed.

It is to be appreciated that the effective length of the cable 76 will be adjusted in order that cable 70 will be slightly tensioned until such time as frame 12 is raised further from the static position or the axle housing 18 drops below its normal static position assumed when the vehicle is stationary and in laden condition. In this manner, when a load represented by one or two persons is placed in the vehicle of which the chassis 10 comprises a part, the leaf spring 20 will be slightly greater flexed and the axle housing 18 will be shifted slightly upwardly relative to the frame 12 from the position illustrated in FIG. 5 of the drawings. Therefore, normal slight up-and-down movement of the axle housing 18 remains unaltered and is controlled by the spring 20 and the associated shock absorber 26. However, as soon as the frame assembly 12 moves upward to the position thereof illustrated in FIG. 5, the cable 76 is tensioned and the rear end of the arm 32 is swung upwardly in a clockwise direction so as to compress the spring 70.

It is to be noted that the spring 70 will be preloaded in the position thereof illustrated in FIG. 5 of the drawings and therefore that any tendency of the axle housing 18 to drop below the position thereof illustrated in FIG. 5 will be met with increasing resistance developed by the spring 70.

Although the roll and sway control assembly 28 is illustrated as supported from the axle housing 44, it is to be noted that the arm 30 of the sway control assembly 28 could be mounted from the frame 12 with the end of the cable 76 remote from the rear end portion 56 of the arm 32 anchored to the axle housing 44. In this manner, there would be no unsprung weight added to the axle housing 44 by the roll and sway control assembly 28.

Figure 8:
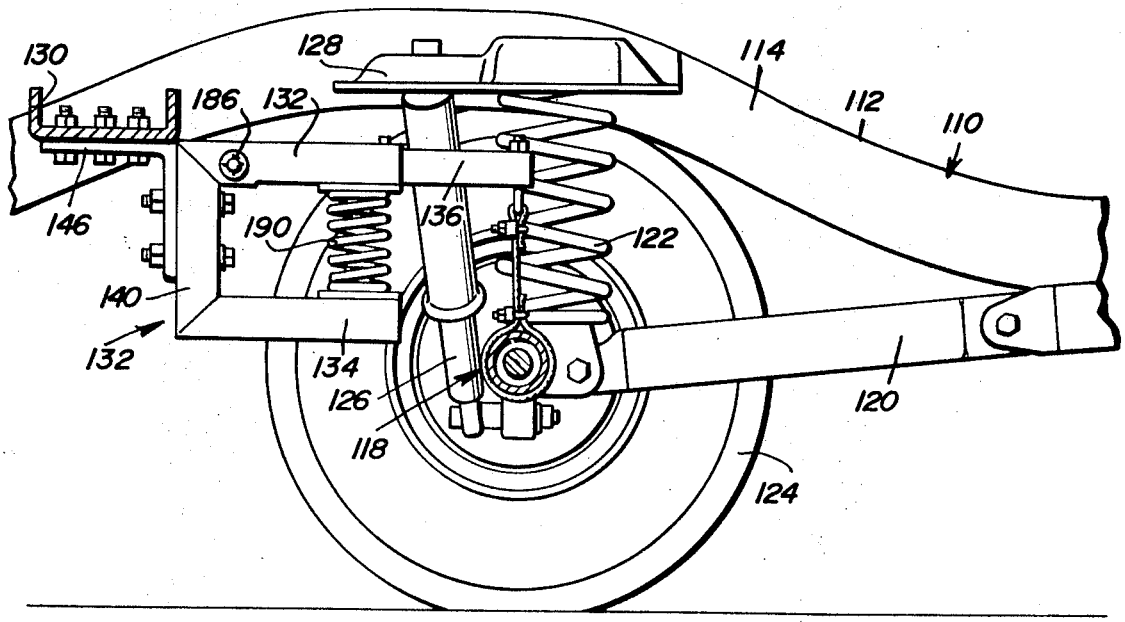
FIG. 8 is a view similar to FIG. 5 and illustrating a modified form of roll and sway control assembly operatively associated with a conventional coil spring suspension assembly.
Figure 10:
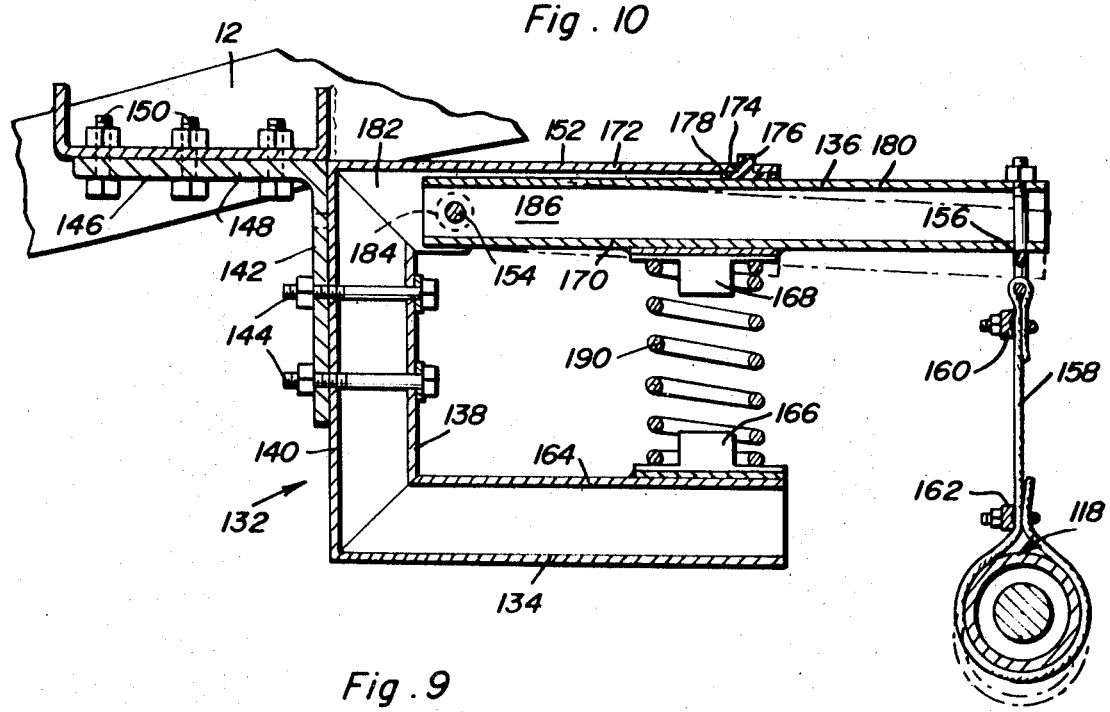
FIG. 10 is an enlarged fragmentary longitudinal vertical sectional view taken substantially upon a plane indicated by section line 10—10 of FIG. 9.
Figure 9:
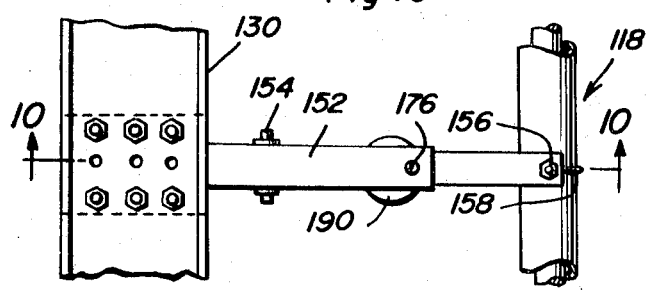
FIG. 9 is a fragmentary top plan view of the roll and sway control assembly illustrated in FIG. 8.

With attention now invited more specifically to FIGS. 8–10 of the drawings, there will be seen a second form of vehicle chassis referred to in general by the reference numeral 110 including a frame 112 having opposite side longitudinal frame members 114. An axle housing 118 is provided and supported from the frame 112 by means of opposite side trailing arm assemblies 120 and coil springs 122 and a pair of wheels 24 are journaled from opposite ends of the axle housing 118. In addition, a pair of opposite side shock absorbers 126 have their lower ends connected to the corresponding ends of the axle housing 118 and their upper ends supported from the spring seats 128 from which the upper end of the springs 122 are supported. A frame 112 includes a crossmember 130 and a modified form of roll and sway control assembly referred to in general by the reference numeral 132 is supported from the crossmember 130.

With attention now invited more specifically to FIG. 10 of the drawings, it may be seen that the roll and sway control assembly 132 includes a first stationary arm 134 and a second swingable arm 136. The arm 134 comprises the lower horizontal leg of an L-shaped bracket 138 whose upstanding leg 140 is secured to the depending flange 142 of an inverted L-shaped bracket by means of suitable fasteners 144. The L-shaped bracket is designated by the reference numeral 146 and includes an upper horizontal leg 148 which is secured to the crossmember 130 by means of suitable fasteners 150. The legs 134 and 140 are integrally formed and a third horizontally disposed leg 152 is formed integrally with the upper end of the leg 140. The leg 152 is tubular and includes a bottom wall 154 whose outer end the leg 152 defines a downwardly opening channel member and one end of the arm 136 is pivotally supported from the base end of the leg 152 by means of a pivot fastener 154. The pivoted end portion of the arm 136 is received within the channel member defined by the leg 152 and the swinging end portion of the arm 136 projects outwardly of and beyond the free end of the leg 132 and has an upstanding eyebolt 156 secured thereto through which the upper end of a flexible cable 158 is looped and secured by means of a clamp 160. The lower end of the cable 158 is looped and secured about the axle housing or assembly 118 by means of a clamp 162 and the outer end of the upper wall 164 of the arm 134 has a spring seat 166 mounted thereon opposed by an upper spring seat 168 secured to the portions of the bottom wall 170 of the arm 136 opposing the spring seat 166.

The upper wall 172 of the leg 152 is apertured as at 174 and an attached shank portion 176 of a resilient bumper 178 is secured through the aperture 174 with the resilient bumper 178 interposed between the upper wall 180 of the tubular arm 136 and the inner surface of the outer end portion of the upper wall 172 of the leg 152.

The width of the arm 136 is less than the spacing between the inner surfaces of the sides 182 of the leg 152 and resilient washers 184 are disposed on the opposite ends of the pivot fastener or bolt 154 immediately outwardly of the outer surfaces of the opposite sides 186 of the arm 136. The axial thickness of the washers 184 is appreciably greater than the thickness of the sides 182 of the leg 152 and annular retainers 186, see FIG. 8, are secured on the opposite ends of the pivot fastener 154 slightly outwardly of the outer surfaces of the sides 182 and engaged with the remote surfaces of the resilient washers 184 which are received through large diameter openings (not shown) formed in the sides 182 of the leg 152.

In operation, the roll and sway control assembly 132 functions in substantially the same manner as the roll and sway control assembly 28. As the frame 112 moves upward the position thereof illustrated in FIG. 8 relative to the axle housing 118, the cable 158 holds the forward free end of the arm 136 to compress the preloaded compression spring 190 which is interposed between the spring seats 166 and 168. Further, the compression is from the bottom at point 166 due to the lower arm 134 with the spring seat 166 attached moving upward with frame 112 and arm 136 having to remain stationary in relationship to axle housing 118 whose wheels remain on the roadway. It is believed that it will be readily appreciated that the roll and sway control assembly 132 may be mounted upon the axle housing or assembly 118 in somewhat the same manner in which the roll and sway control assembly 28 is mounted on the axle housing 44 and that the end of the cable 158 remote from the free end of the arm 136 could then be anchored to the frame 112 in much the same manner that the upper end of the cable 76 is anchored to the frame 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle of the type including a support structure from which a wheel is journaled and supported from a frame structure of said vehicle for generally vertical shifting relative thereto, means yieldably biasing said frame structure upwardly relative to said support structure for increasingly shock yieldingly cushioning support of the frame structure from the support structure, a roll and sway control system including a first arm stationarily supported from one of said structures and a second arm pivotally supported at one end portion from said first arm for oscillation relative thereto about an axis extending transversely of said second arm and swinging movement of the other end portion of said second arm toward and away from an opposing portion of said first arm, said system including means establishing a limit of swinging of said second arm in a first direction in which said other end portion moves away from said opposing portion, means connected between said arms yieldingly biasing said second arm in said first direction, and motion-transmitting means operatively connected between the other end portion of said second arm and the other of said structures operative to hold said other end portion against movement away from said other of said structures in response to upward movement of said frame structure relative to said support structure past a predetermined position thereof.

2. The combination of claim 1 wherein said means connected between said second arm and said other structure comprises one-way motion-transmitting means ineffective to afford any control on said other end portion in the opposite direction upon downward movement of said frame structure past said predetermined position.

3. The combination of claim 2 wherein said means connected between said second arm and said other structure comprises an elongated flexible tension member.

4. The combination of claim 3 wherein at least one end of said tension member includes means operative to adjust the effective length thereof, whereby said predetermined position may be adjusted.

5. The combination of claim 1 wherein said one structure comprises said frame structure.

6. The combination of claim 1 wherein said one structure comprises said support structure.

7. The combination of claim 1 wherein said first arm comprises one arm element of a generally C-shaped arm member including a pair of generally parallel arm elements interconnected at one pair of corresponding ends by means of a connecting arm element extending therebetween, one of said arm elements comprising elongated channel member opening toward the other arm element, said one end of said second arm being pivotally secured in the end of said one arm element adjacent said connecting arm element, said limit-establishing means comprising the other end of said one arm element with which the other end of said second arm is engageable when in said limit position.

8. The combination of claim 7 wherein said biasing means comprises a compression spring interposed between the other end of said second arm and the end of said one arm element remote from said connecting arm element.

9. The combination of claim 8 wherein said arm member is supported from said frame structure and said motion-transmitting means comprises an elongated flexible tension member.

10. The combination of claim 1 wherein said first arm comprises an upstanding arm member and said biasing means comprises a compression spring interposed between the other end of said second arm and the end of said first arm remote from said one end of said second arm.

11. The combination of claim 1 wherein said second arm, when in said limit position is disposed at generally right angles relative to said first arm, said limit-establishing means including an elongated articulated link assembly including a pair of link sections with one pair of adjacent ends pivotally secured together and the other pair of remote ends of said link sections pivotally secured to the remote end portions of said first and second arms, said link sections being disposed in fully relatively extended positions when said second arm is in its limit position.

12. The combination of claim 11 including means acting upon the adjacent ends of said link sections to urge the latter laterally of a plane containing the pivot axes of the remote ends of said link sections.

13. The combination of claim 12 wherein said first arm is supported from said support structure.

14. The combination of claim 13 wherein said motion-transmitting means comprises an elongated flexible tension member connected between said support portion and the other end of said second arms.